US010594198B2

(12) United States Patent
Nakano et al.

(10) Patent No.: US 10,594,198 B2
(45) Date of Patent: Mar. 17, 2020

(54) STATOR STRUCTURE AND RESOLVER

(71) Applicant: MINEBEA MITSUMI Inc., Nagano (JP)

(72) Inventors: Ryo Nakano, Fukuroi (JP); Mutsumi Matsuura, Fukuroi (JP); Hiroshi Abe, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 51 days.

(21) Appl. No.: 15/967,762

(22) Filed: May 1, 2018

(65) Prior Publication Data

US 2018/0323691 A1 Nov. 8, 2018

(30) Foreign Application Priority Data

May 8, 2017 (JP) .................. 2017-092687

(51) Int. Cl.
| | | |
|---|---|---|
| *H02K 24/00* | (2006.01) | |
| *H02K 1/14* | (2006.01) | |
| *H02K 11/21* | (2016.01) | |
| *H02K 3/32* | (2006.01) | |
| *H02K 11/22* | (2016.01) | |
| *H02K 3/18* | (2006.01) | |
| *H02K 1/18* | (2006.01) | |

(Continued)

(52) U.S. Cl.
CPC ............ *H02K 24/00* (2013.01); *H02K 1/146* (2013.01); *H02K 1/185* (2013.01); *H02K 3/18* (2013.01); *H02K 3/325* (2013.01); *H02K 3/38* (2013.01); *H02K 3/522* (2013.01); *H02K 11/022* (2013.01); *H02K 11/21* (2016.01); *H02K 11/225* (2016.01)

(58) Field of Classification Search
CPC ...... H02K 24/80; H02K 11/21; H02K 11/225; H02K 3/18; H02K 3/38
USPC .................................................. 310/68 B, 71
See application file for complete search history.

(56) References Cited

U.S. PATENT DOCUMENTS

| | | |
|---|---|---|
| 7,701,109 B2 | 4/2010 | Ishikawa et al. |
| 7,741,745 B2 | 6/2010 | Takekawa |

(Continued)

FOREIGN PATENT DOCUMENTS

| | | | |
|---|---|---|---|
| JP | 2006-280117 A | 10/2006 | |
| JP | 2008-148397 A | 6/2008 | |

(Continued)

OTHER PUBLICATIONS

Notification of Reasons for Refusal dated Aug. 2, 2017 for corresponding Japanese Application No. 2017-092687 and English translation.

*Primary Examiner* — Terrance L Kenerly
(74) *Attorney, Agent, or Firm* — Pearne & Gordon LLP

(57) ABSTRACT

A stator structure includes a stator core, insulators, a coil, and shield plates. The stator core includes a plurality of teeth extending from a body part of the stator core in a radial direction thereof. The body part is formed in an annular shape. The insulators cover the teeth from both sides in an axial direction of the stator core. The coil is wound around each of the teeth with the insulators interposed therebetween. The coil covers cover the coil from both sides in the axial direction. Each of the coil covers is formed in an annular shape. The shield plates are attached to the stator core from both sides in the axial direction of the stator core with the respective coil covers interposed therebetween.

6 Claims, 7 Drawing Sheets

(51) Int. Cl.
*H02K 3/38* (2006.01)
*H02K 11/225* (2016.01)
*H02K 3/52* (2006.01)

(56) References Cited

U.S. PATENT DOCUMENTS

2017/0284833 A1* 10/2017 Abe .................... G01D 5/2013
2017/0302119 A1* 10/2017 Jang ...................... H02K 1/187

FOREIGN PATENT DOCUMENTS

| JP | 2013-165608 A | 8/2013 |
| JP | 2014-070990 A | 4/2014 |
| JP | 2016-127614 A | 7/2016 |
| JP | 5970355 B2 | 7/2016 |

* cited by examiner

STATOR STRUCTURE AND RESOLVER

CROSS-REFERENCE TO RELATED APPLICATION

The present application claims priority to and incorporates by reference the entire contents of Japanese Patent Application No. 2017-092687 filed in Japan on May 8, 2017.

BACKGROUND OF THE INVENTION

1. Field of the Invention

The present invention relates to a stator structure and a resolver.

2. Description of the Related Art

Conventionally, there is known a resolver that detects a rotation angle of a rotating electrical machine such as a motor and an electrical generator. The resolver is constituted of a stator core provided with a plurality of teeth that radially extend from an inner periphery of a ring-shaped main body part, and a rotor arranged to be opposite to the teeth in the inside of the stator core, for example. A winding is wound around each of the teeth with insulators interposed therebetween. The winding is constituted of an excitation winding to which excitation current is supplied from the outside, and two output windings that output two phase signals in accordance with the rotation angle of the rotor.

When a current is supplied to a winding of the rotating electrical machine that is target for detecting the rotation angle of the resolver, a part of a magnetic flux generated from the winding of the rotating electrical machine is superposed on a signal flowing through the excitation winding wound around a stator of the resolver or a signal output from the output windings so as to strain a wave shape of the signal. Therefore, there exists the possibility that angle detection accuracy of the resolver is reduced and a rotation position of the rotating electrical machine is not able to be detected precisely. Thus, there is proposed a resolver that is able to reduce effects of magnetic noise (magnetic flux) from the outside (see, for example, Japanese Patent No. 5970355).

A stator structure of a resolver as disclosed in Japanese Patent No. 5970355 is constituted of an electromagnetic shield provided with a ring-shaped shield body covering a plurality of teeth. In this stator structure, a stator core has a core fastening part in which core fastening holes are formed as bolt fastening holes. The electromagnetic shield has a shield fastening part in which shield fastening holes are formed as bolt fastening holes aligned with the core fastening holes. The stator structure is constituted so that the core fastening part is fastened with the shield fastening part by using the core fastening holes and the shield fastening holes.

However, the stator structure of the resolver as disclosed in Japanese Patent No. 5970355 has a configuration in which the electromagnetic shield covers the teeth on one surface side of the stator, and thus the magnetic flux from the outside enters the inside of the stator from the other surface side of the stator in some cases. Thus, there exists possibility that the angle detection accuracy of the resolver is reduced not to be able to precisely detect the rotation position of the rotating electrical machine. Furthermore, the stator core and the electromagnetic shield are in contact with each other, the magnetic flux from the outside may enter the inside of the stator through the electromagnetic shield.

SUMMARY OF THE INVENTION

According to an aspect of the present invention, a stator structure includes a stator core, insulators, a coil, and shield plates. The stator core includes a plurality of teeth extending from a body part of the stator core in a radial direction thereof. The body part is formed in an annular shape. The insulators cover the teeth from both sides in an axial direction of the stator core. The coil is wound around each of the teeth with the insulators interposed therebetween. The coil covers cover the coil from both sides in the axial direction. Each of the coil covers is formed in an annular shape. The shield plates are attached to the stator core from both sides in the axial direction of the stator core with the respective coil covers interposed therebetween.

DETAILED DESCRIPTION OF THE PREFERRED EMBODIMENTS

Hereinafter, a stator structure and a resolver according to embodiments will be described in detail with reference to the accompanying drawings. Moreover, the embodiments described below are merely examples, and not intended to limit the present disclosure.

First Embodiment

Figure 1:
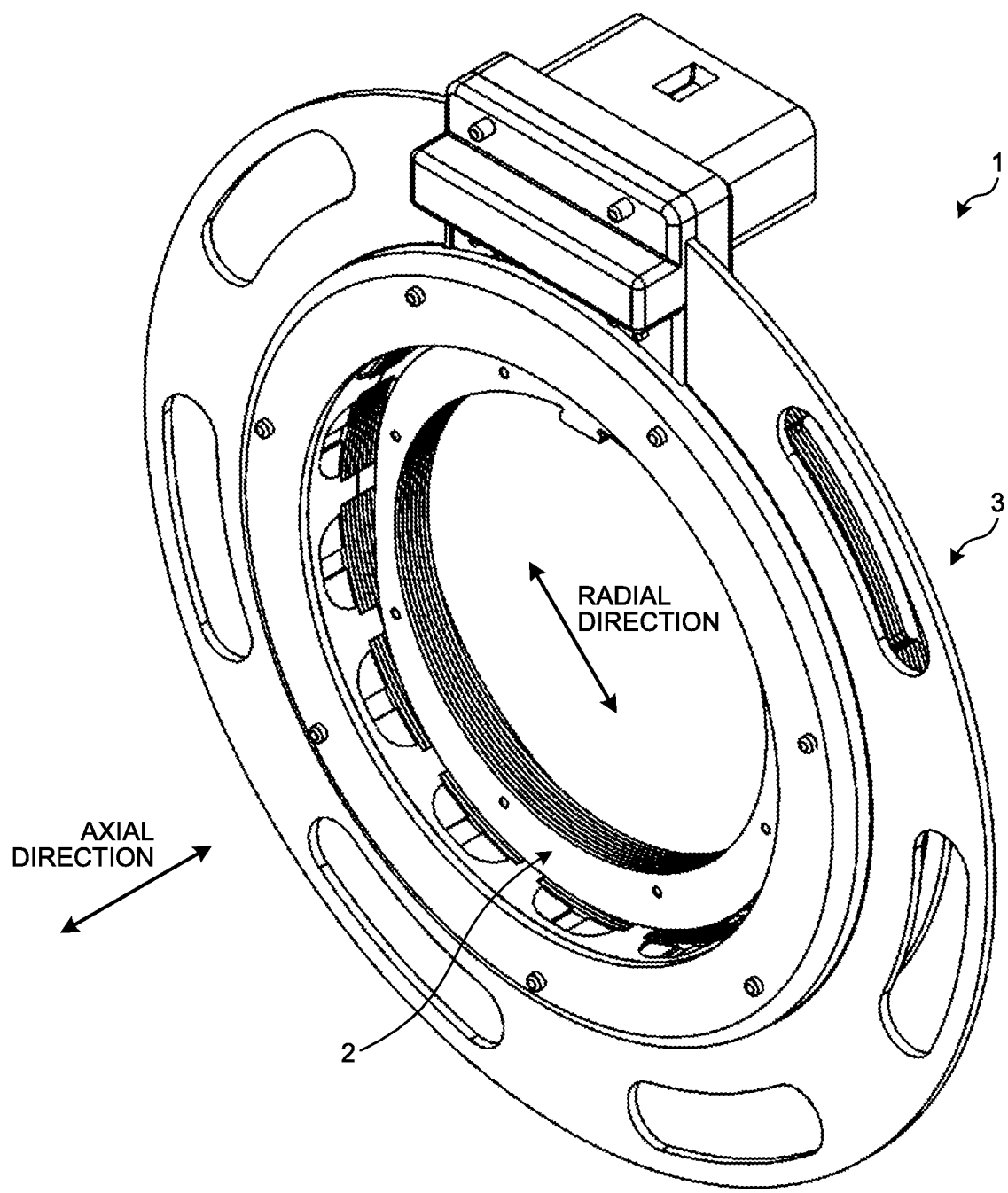
FIG. 1 is a perspective view illustrating a resolver according to a first embodiment.

A resolver 1 according to a first embodiment will be explained with reference to FIG. 1. FIG. 1 is a perspective view illustrating the resolver according to the first embodiment. As illustrated in FIG. 1, the resolver 1 according to the first embodiment is a variable reluctance (VR) type resolver having a resolver rotor 2 (hereinafter, may be referred to as "rotor 2") and a stator structure 3. The resolver 1 according to the first embodiment is an inner rotor type resolver in which the stator structure 3 being a stator is arranged around the rotor 2 being a rotor.

The rotor 2 has a laminated structure in which a plurality of steel-sheet cores each of which is composed of a soft magnetic material, such as a silicon steel sheet, is laminated to each other; is attached to a rotation shaft 20a (see FIG. 5) of a motor; and is arranged in the inside of the stator structure 3. An axial direction depicted in each of the drawings coincides with the axial direction of the rotation shaft 20a of the motor connected with the rotor 2. Furthermore, as illustrated in the drawings, a radial direction coincides with the direction perpendicular to the axial direction. Here, the radial direction indicates any direction parallel to the surface perpendicular to the axial direction. In the drawings, one of the radial directions is indicated by a double-headed arrow.

Figure 2:
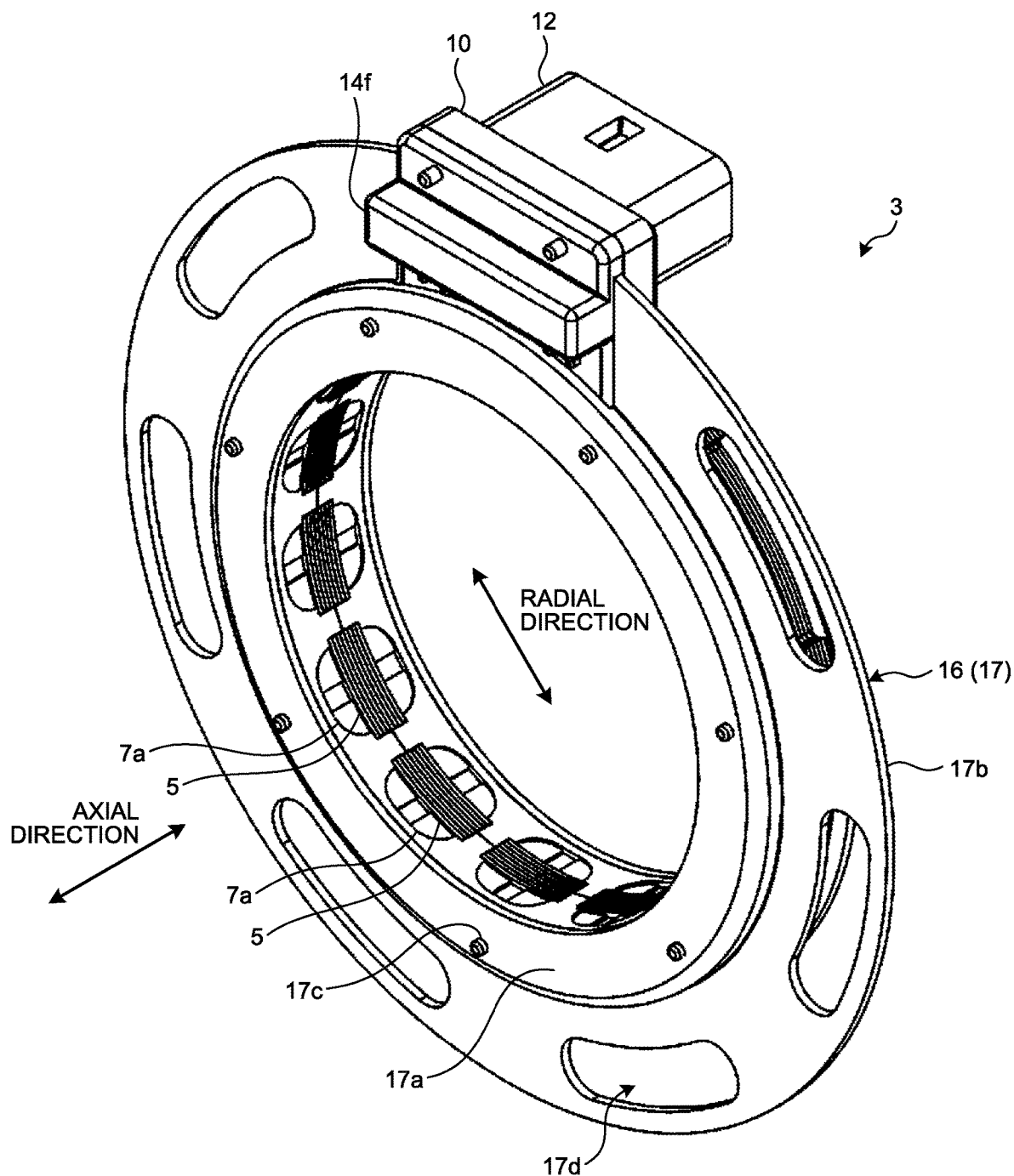
FIG. 2 is a perspective view illustrating a stator structure illustrated in FIG. 1.
Figure 3:
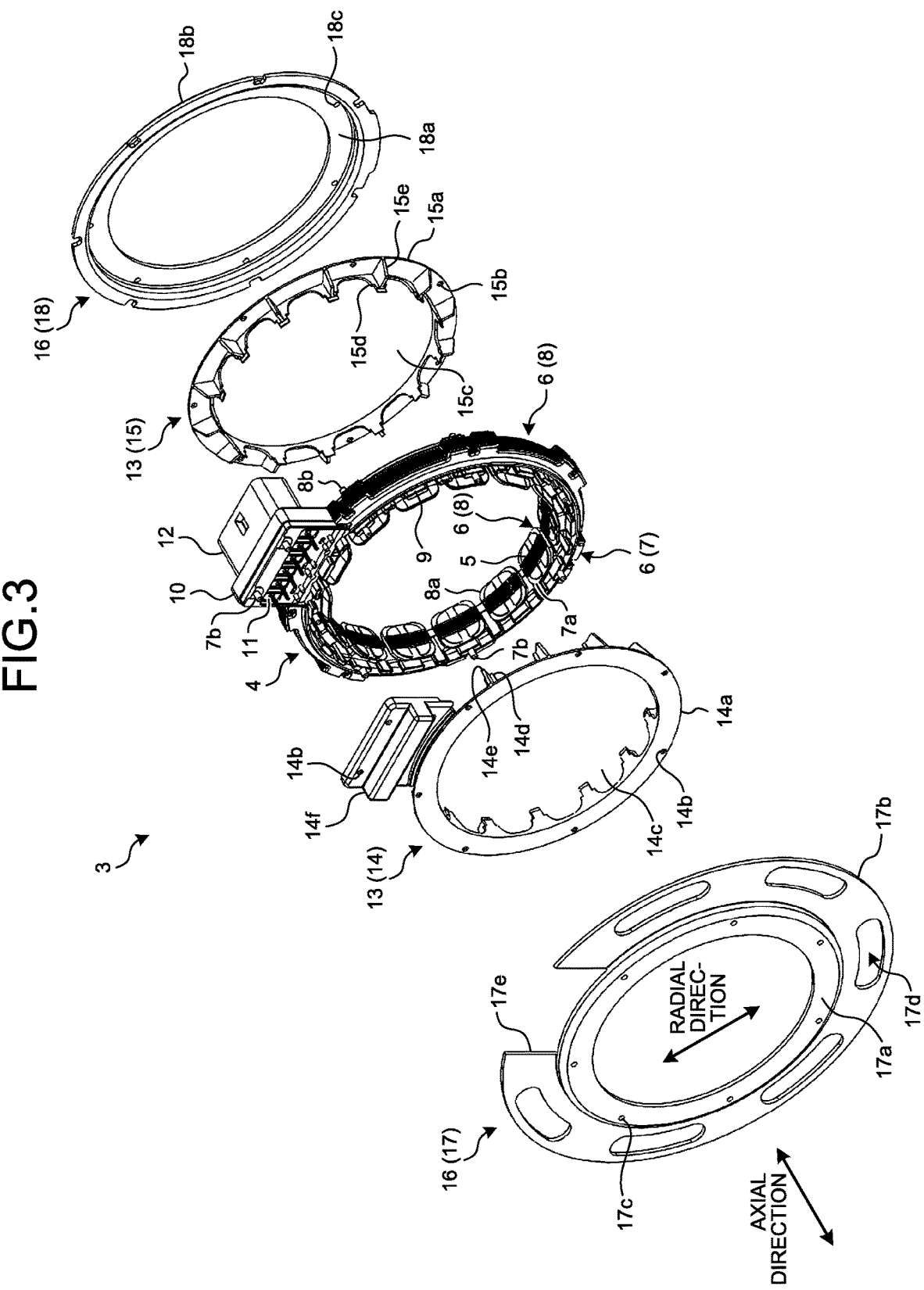
FIG. 3 is an exploded perspective view illustrating the stator structure illustrated in FIG. 2.
Figure 4:
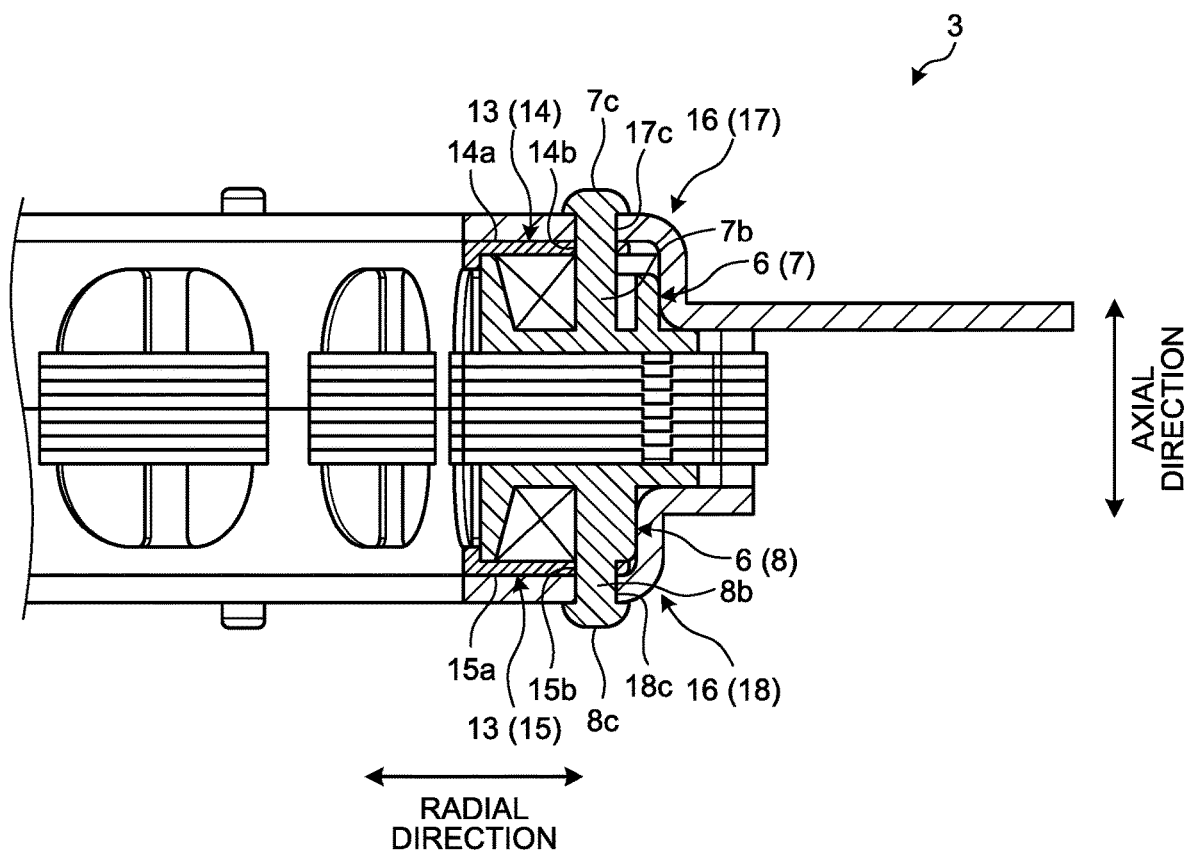
FIG. 4 is a cross-sectional view illustrating the stator structure as viewed along a radial direction illustrated in FIG. 2.
Figure 5:
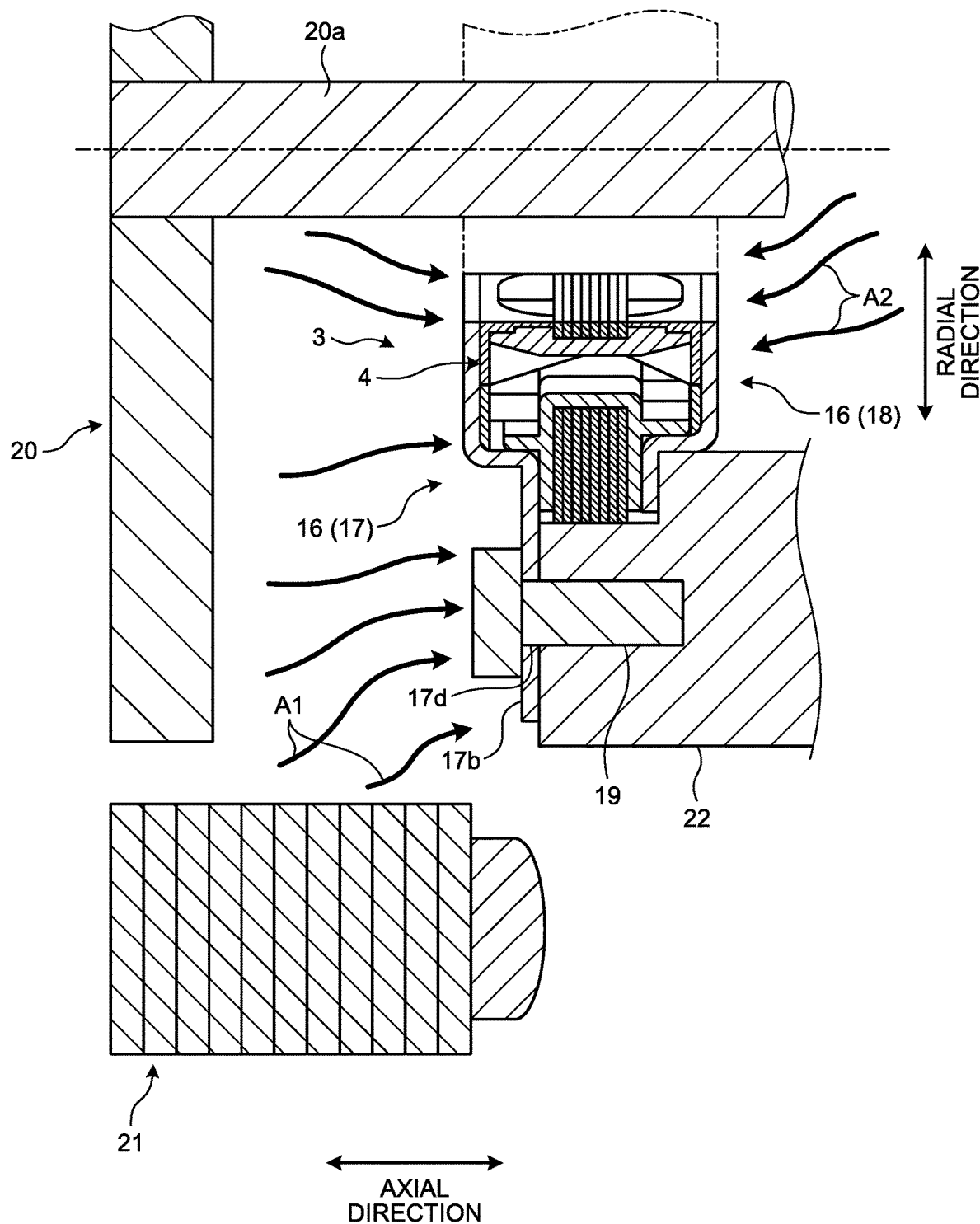
FIG. 5 is a cross-sectional view illustrating a state in which the resolver illustrated in FIG. 1 is attached.

Next, the stator structure 3 will be explained with reference to FIGS. 2 to 5. FIG. 2 is a perspective view illustrating the stator structure 3 illustrated in FIG. 1. FIG. 3 is an exploded perspective view illustrating the stator structure 3 illustrated in FIG. 2. FIG. 4 is a cross-sectional view illustrating the stator structure 3 as viewed along the radial direction illustrated in FIG. 2. FIG. 5 is a cross-sectional view illustrating a state in which the resolver 1 illustrated in FIG. 1 is attached.

The stator structure 3 includes a stator core 4, a coil 9, and an insulator 6. The stator core 4, the coil 9, and the insulator 6 may be collectively referred to as a stator (resolver stator). The stator core 4 is constituted of a predetermined number of pressed steel sheets each of which is obtained by pressing a steel sheet composed of a soft magnetic material, such as a silicon steel sheet. The pressed steel sheets are laminated in the axial direction to constitute the stator core 4. The stator core 4 includes a plurality of teeth 5 that extend in the radial direction (in the present embodiment, inward in radial direction) from an annular part. The number of the teeth 5 of the stator core 4 is not limited thereto. The teeth 5 are arranged at equal angle intervals in a circumferential direction of the annular part, and each of the teeth 5 has a distal end part that extends in the circumferential direction. The winding (coil 9) to be mentioned later is wound around each of the teeth 5 with the insulator 6 interposed therebetween. There is formed a space (hereinafter, may be referred to as "slot") between every adjacent two of the teeth 5.

The insulator 6 is formed by injection molding with the use of an insulation resin material. The insulator 6 is integrally formed with the stator core 4 on its predetermined surface by insert molding, for example. The insulator 6 covers peripheral surfaces of the teeth 5 except surfaces opposite to the rotor 2 from both sides in the axial direction of the stator core 4. For convenience of explanation, a part of the insulator 6 that covers the teeth 5 from one side in the axial direction of the stator core 4 is referred to as a first insulator 7, and a part of the insulator 6 that covers the teeth 5 from the other side in the axial direction is referred to as a second insulator 8. The first insulator 7 and the second insulator 8 are connected to be integrally formed.

The first insulator 7 is provided with a terminal block part 10 that extends outward in the radial direction of the stator core 4. The terminal block part 10 includes a plurality of terminals 11 implanted thereinto, and a female connector housing 12 is also formed therein. The terminal block part 10 is able to be formed simultaneously with the first insulator 7. One end of each of the terminals 11 twines therearound an end of a winding that constitutes the corresponding coil 9, and the other end of the corresponding terminal 11 protrudes into the inside of the connector housing 12. The other end of each of the terminals 11 is connected with an external connector. The first insulator 7 and the terminal block part 10 are integrally formed with each other by injection molding with the use of an insulation resin material.

The first insulator 7 is provided with a plurality of arms each of which extends inward from the annular part in the radial direction. A flange part 7a is provided to a distal end of each of the arms. Each of the arms of the first insulator 7 covers a part (half portion) of corresponding one of the teeth 5 of the stator core 4. The flange part 7a prevents winding deformation of the winding (coil 9) wound around the arm. A plurality of cross pins is integrally formed with respective roots (outer side portions in radial direction of slots) each of which is located between the adjacent arms. The cross pins support respective jumper wires of the winding that constitutes the coil 9.

A plurality of pins 7b (one example of "first pins") (hereinafter, may be referred to as "resin pins 7b") is integrally formed with the annular part located on the roots of the arms of the first insulator 7. The resin pins 7b are formed in the annular part of the first insulator 7 at equal angle intervals. In addition, the plurality of resin pins 7b is integrally formed with the terminal block part 10 on outer peripheral side of the terminal 11.

Similarly to the first insulator 7, the second insulator 8 is provided with a plurality of arms that extends inward from the annular part in the radial direction. A flange part 8a is provided to a distal end of each of the arms. Each of the arms of the second insulator 8 covers a part (another half portion) of a corresponding one of the teeth 5 of the stator core 4. The flange part 8a prevents winding deformation of the winding (coil 9) wound around the arm. A plurality of pins 8b (one example of "second pins") (hereinafter, may be referred to as "resin pins 8b") to be mentioned later is integrally formed with the annular part of the respective roots each of which is located on the corresponding arm of the second insulator 8. The resin pins 8b are formed on the annular part of the second insulator 8 at equal angle intervals (not illustrated). Each of the resin pins 8b is formed on the second insulator 8 so that the second insulator 8 is located on a place identical with the place on which the corresponding resin pin 7b is located when the first insulator 7 and the second insulator 8 are attached to the stator core 4.

In one example mentioned above, although the cross pins are formed in the first insulator 7, the cross pins may be formed in the second insulator 8. The positions in which the resin pins 7b and the resin pins 8b are formed is not limited to the case above. For example, the resin pin 7b may be formed on the cross pin. Furthermore, for example, when the cross pin is formed in the second insulator 8, the resin pin 8b may be formed on the cross pin. In this case, compared with the constitution in which the resin pins 7b and the resin pins 8b are formed on the respective roots of the arms, the degree of freedom of nozzle movements in a coil winding machine when the winding is wound around the arm becomes high. Furthermore, when the degree of freedom of the outside dimension of the insulator 6 is high, the resin pin 7b may be formed on a place closer to an outer peripheral side than the cross pin, and the position of the resin pin 7b is not particularly limited thereto. In this case, the nozzle movements of the coil winding machine when the winding is wound around the arm are not restricted.

In one example mentioned above, although the insulator 6 is integrally formed with the stator core 4 by insert molding, the insulator 6 may be separately formed from the stator core 4 so as to be sandwiched between the first insulator 7 and the second insulator 8. In one example mentioned above, although the first insulator 7 and the terminal block part 10 are integrally formed with each other by injection molding, for example, a constitution in which the terminal block part 10 formed with the use of another material is attached may be employed. For example, a constitution in which the connector housing 12 is not formed may be employed.

The coil 9 is constituted of an excitation winding and an output winding. The output winding is constituted of a sine-phase output winding that outputs a sine-phase output signal and a cosine-phase output winding that outputs a cosine-phase output signal.

As illustrated in FIG. 3, the stator structure 3 constituted of, in addition to the stator, ring-shaped coil covers 13 that covers the coil 9 from both sides in the axial direction. As illustrated in FIG. 3, in the present embodiment, the coil covers 13 are constituted of a first coil cover 14 that covers the coil 9 from one side of the stator core 4 in the axial direction and a second coil cover 15 that covers the coil 9 from the other side of the stator core 4 in the axial direction, and has a ring shape as a whole. Although the constituent material of each of the first coil cover 14 and the second coil cover 15 is not limited, each of the first coil cover 14 and the second coil cover 15 is composed of, for example, a resin material, and, for example, is formed by injection molding. As the resin material, an insulation resin material etc. may be used. The first coil cover 14 and the second coil cover 15 cover the coil 9 from both sides of the stator core 4 in the axial direction to protect the coil 9.

A ring part 14a that constitutes a body of the first coil cover 14 is formed in an annular shape as a whole. The ring part 14a is provided with a terminal-block covering part 14f that covers the above-mentioned terminal block part 10.

The terminal-block covering part 14f, which covers the terminal block part 10, is provided with a plurality of separation members (segment plates) arranged therein, for example. The terminals 11 are housed in respective spaces formed by the separation members in a spaced-apart manner. In this manner, the constitution such that the terminals 11 are housed in the respective spaces is capable of preventing an electrical short circuit between the terminals 11 due to extraneous materials entered the inside of the stator structure 3. The terminal block part 10 is provided with a terminal cover made of a resin material so as to protect the terminals 11 around which the coil 9 is twined to be connected. In the terminal block part 10, the resin pin 7b integrally formed with the terminal block part 10 is inserted into a through hole 14b formed in the terminal-block covering part 14f, a distal end part of the resin pin 7b protruding from the through hole 14b is thermally deformed, for example, and thus the terminal block part 10 and the terminal-block covering part 14f are fixed to each other.

The through holes (first through holes) 14b are formed, along the axial direction of the stator core 4, in the ring part 14a of the first coil cover 14 at even pitch intervals in the circumferential direction, and the through holes 14b are also formed on an outer peripheral side of the terminal-block covering part 14f. The first through holes 14b of the ring part 14a are formed at pitch intervals equal to intervals at which the resin pins 7b are formed in the annular part of the first insulator 7. The through holes 14b of the terminal-block covering part 14f are formed at pitch intervals equal to intervals at which the resin pins 7b are formed in the terminal block part 10.

A plurality of protrusion parts 14d each of which extends in the axial direction is formed on a periphery of an opening 14c in the center of the first coil cover 14. For example, each of the protrusion parts 14d includes a stepped portion formed in a distal end thereof. The protrusion parts 14d are formed in the circumferential direction at even pitch intervals. Each of the protrusion parts 14d has a shape with a width gradually increased toward the ring part 14a in the circumferential direction. Each of the protrusion parts 14d is arranged in the slot between corresponding two of the teeth 5. In this manner, the first coil cover 14 covers the stator core 4 from both sides of the stator core 4 in the axial direction as well as the protrusion parts 14d fill the respective slots between the teeth 5, so that it is possible to protect the coil 9 and to prevent extraneous materials from entering the inside of the stator structure 3.

There is formed a rib 14e on a peripheral face of the protrusion part 14d of the first coil cover 14. The rib 14e is formed on the ring part 14a in an erected manner, and is integrally formed with the protrusion part 14d. In this case, the rib 14e extends in a direction substantially perpendicular to a peripheral face of the protrusion part 14d. In this manner, when the rib 14e is provided, it is possible to reinforce the strength of the protrusion part 14d.

The second coil cover 15 having a ring part 15a that constitutes a body of the second coil cover 15 is formed in an annular shape as a whole. The inside diameter and the outside diameter of the ring part 15a of the second coil cover 15 are approximately the same as the outside diameter and the inside diameter of the ring part 14a of the first coil cover 14, respectively.

A plurality of through holes (first through holes) 15b is formed, along the axial direction of the stator core 4, in the ring part 15a of the second coil cover 15 at even pitch intervals in the circumferential direction. The first through holes 15b of the ring part 15a are formed at pitch intervals equal to intervals at which the resin pins 8b are formed in the annular part of the second insulator 8.

A plurality of protrusion parts 15d each of which extends in the axial direction is formed on a periphery of an opening 15c in the center of the second coil cover 15. For example, each of the protrusion parts 15d includes a stepped portion formed in a distal end thereof. The protrusion parts 15d are formed in the circumferential direction at even pitch intervals. Each of the protrusion parts 15d has a shape with a width gradually increased toward the ring part 15a in the circumferential direction. Each of the protrusion parts 15d is arranged in the slot between corresponding two of the teeth 5. In this manner, the second coil cover 15 covers the stator core 4 from both sides of the stator core 4 in the axial direction as well as the protrusion parts 15d fill the respective slots between the teeth 5, so that it is possible to protect the coil 9 and to prevent extraneous materials from entering the inside of the stator structure 3.

There is formed a rib 15e on a peripheral face of the protrusion part 15d of the second coil cover 15. The rib 15e is formed on the ring part 15a in an erected manner, and is integrally formed with the protrusion part 15d. In this case, the rib 15e extends in a direction substantially perpendicular to a peripheral face of the protrusion part 15d. In this manner, when the rib 15e is provided, it is possible to reinforce the strength of the protrusion part 15d.

The above-mentioned coil covers 13, in other words, the first coil cover 14 and the second coil cover 15 are attached to the stator core 4 from both sides of the stator core 4 in the axial direction. In the present embodiment, the first coil cover 14 and the second coil cover 15 cover the stator core 4 from both sides of the stator core 4 in the axial direction so that they are connected with each other via the insulator 6.

As illustrated in FIG. 3, the stator structure 3 is constituted of shield plates 16 in addition to the stator and the coil covers 13. In other words, the stator structure 3 is constituted of the stator, the coil covers 13, and the shield plates 16. As illustrated in FIG. 3, the shield plates 16 are attached to the stator core 4 from both sides of the stator core 4 in the axial direction with the coil covers 13 interposed therebetween. The shield plates 16 has a first shield plate 17 that is attached from one side of the stator core 4 in the axial direction, and a second shield plate 18 that is attached from the other side of the stator core 4 in the axial direction. The first shield plate 17 is formed with the use of, for example, an iron material, preferably, a cold-rolled steel plate (SPCC: Steel Plate Cold Commercial) among metal materials. The first shield plate 17 has an annular part 17a and a flange part 17b.

The annular part 17a is formed in an annular shape, and is arranged at a position corresponding to the stator core 4. A plurality of through holes 17c (second through holes 17c) is formed, along the axial direction of the stator core 4, in the annular part 17a at even pitch intervals in the circumferential direction. The flange part 17b is formed so that the flange part 17b extends from the annular part 17a in the radial direction. A plurality of holes (long holes) 17d is formed in the flange part 17b. Concluding members 19, such as bolts for attachment, are inserted into the holes 17d when the stator structure 3 is attached to a housing 22 (see FIG. 5) etc. The flange part 17b is provided with a notched part 17e in which the terminal block part 10 and the connector housing 12 are arranged.

Similarly to the first shield plate 17, the second shield plate 18 is formed with the use of, for example, an iron material, preferably, a cold-rolled steel plate (SPCC) among metal materials. The second shield plate 18 has an annular part 18a and a flange part 18b. The annular part 18a is formed in an annular shape, and is arranged at a position corresponding to the stator core 4. A plurality of through holes 18c (second through holes 18c) is formed, along the axial direction of the stator core 4, in the annular part 18a at even pitch intervals in the circumferential direction. The flange part 18b is formed so that the flange part 18b extends from the annular part 18a in the radial direction. The flange part 18b is formed so as to be narrower than the flange part 17b of the first shield plate 17.

In one example mentioned above, although the holes (holes 17d) into which the fastening members 19 (see FIG. 5) for attachment are inserted are formed in the flange part 17b of the first shield plate 17, the holes (holes 17d) may be formed in the second shield plate 18. In this case, the flange part 18b of the second shield plate 18 is formed in a shape having a large width. Both of the flange parts 17b and 18b of the first shield plate 17 and the second shield plate 18 may be formed to have large widths, and further holes, into which the fastening members 19 are inserted, may be formed in both of the flange parts 17b and 18b.

Here, an attached structure of the shield plates 16 (first shield plate 17 and second shield plate 18) will be explained with reference to FIGS. 3 and 4.

As illustrated in FIGS. 3 and 4, the first shield plate 17 is connected with the first insulator 7 with the first coil cover 14 interposed therebetween, and the second shield plate 18 is connected with the second insulator 8 with the second coil cover 15 interposed therebetween. In this case, one edge part of the insulator 6, in other words, the plurality of resin pins 7b formed on the first insulator 7 is inserted into the first through holes 14b of the first coil cover 14, and then is inserted into the second through holes 17c of the first shield plate 17; and the first insulator 7, the first coil cover 14, and the first shield plate 17 are connected to one another via the resin pins 7b of the first insulator 7.

In this case, distal end parts 7c (one example of "first distal end parts") of the respective resin pins 7b of the first insulator 7 protrude from a surface of the first shield plate 17 in a state where the resin pins 7b are inserted into the respective first through holes 14b and the respective second through holes 17c. As illustrated in FIG. 4, in a state where the distal end parts 7c of the resin pins 7b protrude from the surface of the first shield plate 17, when the distal end parts 7c are, for example, thermally deformed so as to fix the distal end parts 7c to the first shield plate 17, the first insulator 7, the first coil cover 14, and the first shield plate 17 are connected with one another. Caulking fixing means such as thermal caulking, infrared ray caulking, and ultrasonic wave caulking, or welding means such as ultrasonic wave welding may be selected among from fixing means as the fixing means.

Furthermore, the other edge part of the insulator 6, in other words, the plurality of resin pins 8b formed on the second insulator 8 is inserted into the first through hole 15b of the second coil cover 15, and then is inserted into the second through holes 18c of the second shield plate 18, and the second insulator 8, the second coil cover 15, and the second shield plate 18 are connected to one another via the resin pins 8b of the second insulator 8.

In this case, distal end parts 8c (one example of "second distal end parts") of the respective resin pins 8b of the second insulator 8 protrude from a surface of the second shield plate 18 in a state where the resin pins 8b are inserted into the respective first through holes 15b and the respective second through hole 18c. As illustrated in FIG. 4, in a state where the distal end parts 8c of the resin pins 8b protrude from the surface of the second shield plate 18, when the distal end parts 8c are, for example, thermally deformed so as to fix the distal end parts 8c to the second shield plate 18, the second insulator 8, the second coil cover 15, and the second shield plate 18 are connected with one another. In this case, caulking fixing means such as thermal caulking, infrared ray caulking, and ultrasonic wave caulking, or welding means such as ultrasonic wave welding may be also selected among from fixing means as the fixing means.

In this manner, the first insulator 7, the first coil cover 14, and the first shield plate 17 are able to be connected to one another via the resin pins 7b formed in the first insulator 7. Furthermore, the second insulator 8, the second coil cover 15, and the second shield plate 18 are able to be connected to one another via the resin pins 8b formed in the second insulator 8. In this case, the distal end parts 7c and 8c of the resin pins 7b and 8b are, for example, thermally deformed for fixing, so that it is possible to perform a visual check of the appearance state of fixing parts. Consequently, it is possible to improve the reliability of the stator.

Here, an attachment structure of the resolver 1 will be explained with reference to FIG. 5. In FIG. 5, a state is schematically illustrated in which the resolver 1 is attached to the housing 22 (part to be attached) in order to detect a detection target that is a rotation angle of a rotating electrical machine (for example, motor constituted of rotor 20 and stator 21). Arrows (bold lines) depicted in FIG. 5 indicate magnetic fluxes from the outside. As illustrated in FIG. 5, the fastening members 19 are inserted into the respective holes 17d formed in the flange part 17b of the first shield plate 17 among the shield plates 16, so that the resolver 1 is attached to the housing 22.

For example, when fastening holes are formed in both of the stator core 4 and one of the shield plates 16 (for example, first shield plate 17), an outside diameter of the stator core 4 is not able to be small. By employing the above-mentioned structure, the holes 17d, into which the fastening members 19 are inserted, are formed in not the stator core 4 but one of the shield plates 16 (first shield plate 17), and thus it is possible to reduce the outside diameter of the stator core 4.

By employing the stator structure 3 according to the first embodiment, the shield plates 16 (first shield plate 17 and second shield plate 18) are attached to the stator core 4 from both sides of the stator core 4 in the axial direction, and thus as illustrated in FIG. 5, it is possible to prevent magnetic fluxes (magnetic fluxes A2) from entering the inside of the stator structure 3 through a surface (surface on one side) that is opposite to a surface (surface on the other side) facing a detection target of the stator structure 3. In other words, it is possible to highly prevent magnetic fluxes A1 and the magnetic fluxes A2 from entering the inside of the stator structure 3 from the outside. Consequently, it is possible to prevent reduction in the angle detection accuracy due to the magnetic fluxes A1 and A2 from the outside.

The shield plates 16 (first shield plate 17 and second shield plate 18) are attached to the stator core 4 via the respective coil covers 13 (first coil cover 14 and second coil cover 15), and thus the shield plates 16 are not in contact with the stator core 4. Thus, it is possible to more reliably prevent the magnetic fluxes A1 and A2 (see FIG. 5) from entering the inside of the stator structure 3 from the outside.

Moreover, by employing the resolver 1 according to the first embodiment, it is possible to highly prevent the magnetic fluxes A1 and A2 (see FIG. 5) from entering the inside of the stator structure 3 from the outside, so that it is possible to prevent reduction in the angle detection accuracy due to the magnetic fluxes A1 and A2 from the outside.

Second Embodiment

Figure 6:
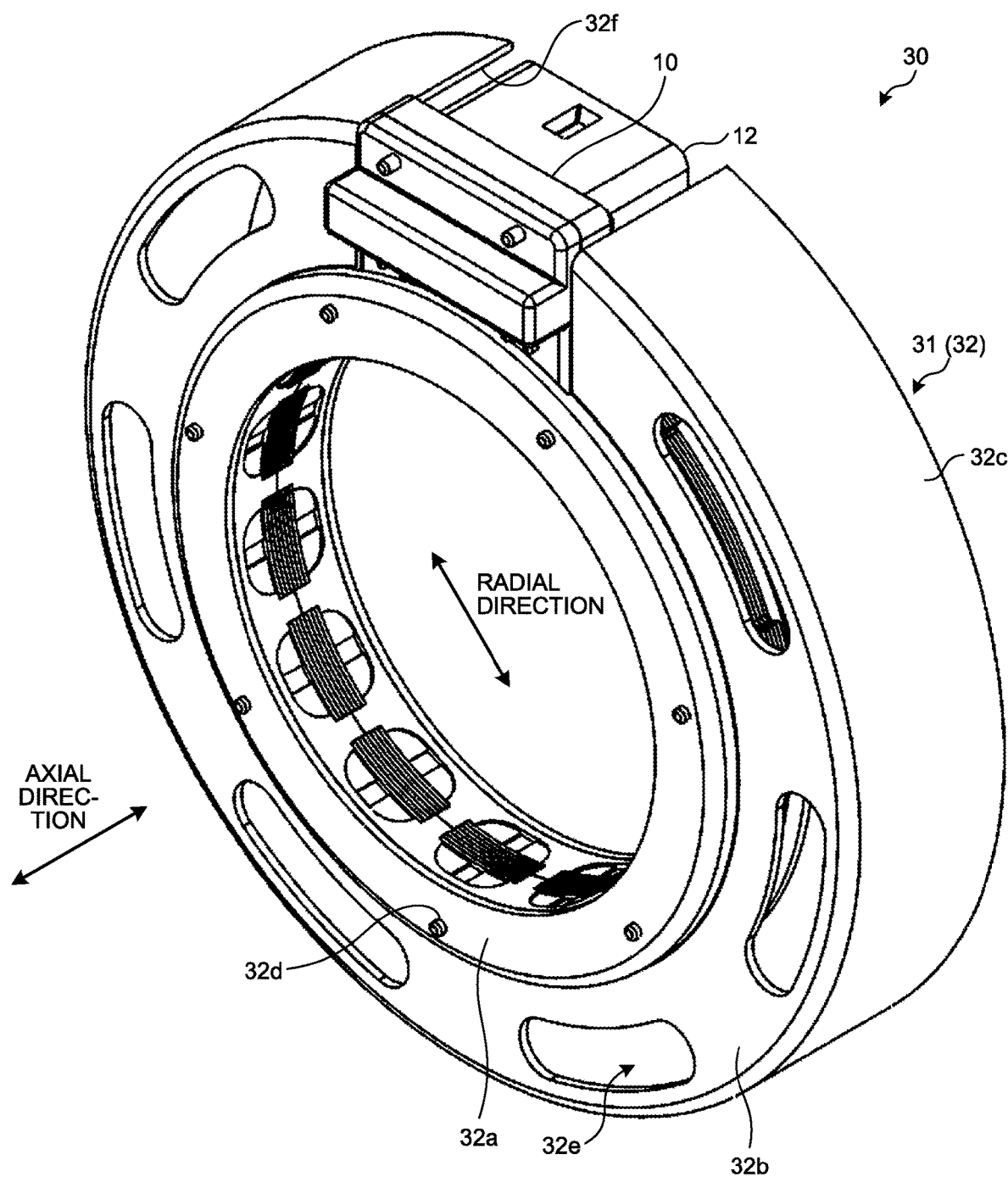
FIG. 6 is a perspective view illustrating a stator structure according to a second embodiment.
Figure 7:
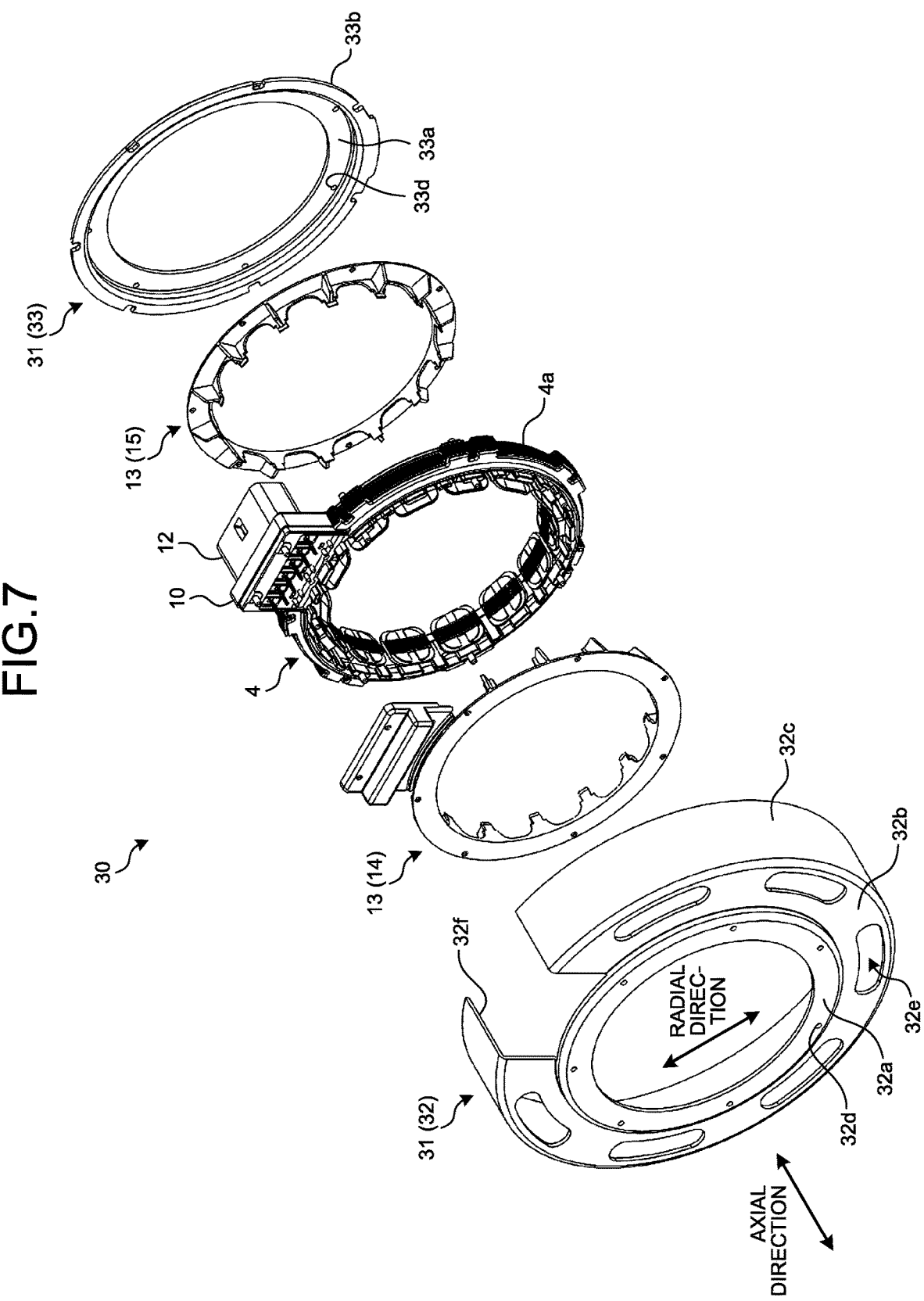
FIG. 7 is an exploded perspective view illustrating the stator structure illustrated in FIG. 6.

Next, a stator structure 30 of a resolver according to a second embodiment will be explained with reference to FIGS. 6 and 7. FIG. 6 is a perspective view illustrating the stator structure 30 according to the second embodiment. FIG. 7 is an exploded perspective view illustrating the stator structure 30 illustrated in FIG. 6. A point of the stator structure 30 according to the second embodiment that is different from the stator structure 3 according to the above-mentioned first embodiment is a constitution of shield plates 31. Therefore, in the following description of the second embodiment, the point different from the above-mentioned first embodiment will be mainly explained, and explanation of other parts is appropriately omitted.

As illustrated in FIGS. 6 and 7, the stator structure 30 according to the second embodiment has the shield plates 31. The shield plates 31 are attached to the stator core 4 from both sides of the stator core 4 in the axial direction with the coil covers 13 (first coil cover 14 and second coil cover 15) interposed therebetween. The shield plates 31 has a first shield plate 32 that is attached from one side of the stator core 4 in the axial direction, and a second shield plate 33 that is attached from the other side of the stator core 4 in the axial direction.

The first shield plate 32 is formed with the use of, for example, an iron material, preferably, a cold-rolled steel plate (SPCC) among metal materials. The first shield plate 32 has an annular part 32a, a plate part 32b, and a cylindrical part 32c. The annular part 32a is a body of the first shield plate 32, and is arranged at a position corresponding to the stator core 4. A plurality of through holes (second through holes) 32d is formed, along the axial direction of the stator core 4, in the annular part 32a (hereinafter, may be referred to as "ring part 32a" because annular part is formed in ring shape) at even pitch intervals in the circumferential direction.

The plate part 32b is formed so as to outward extend from the annular part 32a in the radial direction. A plurality of holes (long holes) 32e is formed in the plate part 32b. The fastening members 19 (see FIG. 5), such as bolts for attachment, are inserted into the respective holes 32e when the stator structure 30 is attached to the housing 22 (see FIG. 5) etc.

The cylindrical part 32c (hereinafter, may be referred to as "cylinder part 32c" because cylindrical part is formed in cylindrical shape) is formed so as to extend from an outer periphery end of the plate part 32b in the axial direction of the stator core 4. A notched part 32f is continuously formed in the plate part 32b and the cylindrical part 32c from the plate part 32b to the cylindrical part 32c. The terminal block part 10 and the connector housing 12 are arranged in the notched part 32f.

As illustrated in FIGS. 6 and 7, in a state where the first shield plate 32 is attached to the stator core 4, the cylindrical part 32c is arranged on an outer side of a side surface 4a in the radial direction. The side surface 4a connects an end edge of a surface (first surface) on one side of the stator core 4 in the axial direction with an end edge of a surface (second surface) on the other side of the stator core 4 in the axial direction. In other words, the first shield plate 32 covers the first surface and the side surface 4a of the stator core 4.

The second shield plate 33 is formed with the use of, for example, an iron material, preferably, a cold-rolled steel plate (SPCC) among metal materials. The second shield plate 33 has an annular part 33a and a flange part 33b. The annular part 33a is a body of the second shield plate 33, and is arranged at a position corresponding to the stator core 4. A plurality of through holes (second through holes) 33d is formed, along the axial direction of the stator core 4, in the annular part 33a at even pitch intervals in the circumferential direction. The flange part 33b is formed so as to extend in the radial direction from the annular part 33a. The second shield plate 33 according to the present embodiment has a constitution similar to the constitution of the above-mentioned second shield plate 18 (see FIG. 3) according to the first embodiment.

By employing the stator structure 30 according to the second embodiment, the shield plates 31 (first shield plate 32 and second shield plate 33) are attached to the stator core 4 from both sides of the stator core 4 in the axial direction, so that it is possible to cover substantially all of the surfaces of the stator core 4. Thus, it is possible to prevent magnetic fluxes from entering the inside of the stator structure 30 from the outside. The magnetic fluxes include a magnetic flux from a surface (second surface) side opposite to a surface (first surface) of the stator structure 30 facing a detection target. In other words, it is possible to highly prevent magnetic fluxes from entering the inside of the stator structure 30 from the outside. Consequently, it is possible to prevent reduction in the angle detection accuracy due to the magnetic fluxes from the outside.

The shield plates 31 (first shield plate 32 and second shield plate 33) are attached to the stator core 4 with the coil covers 13 (first coil cover 14 and second coil cover 15) interposed therebetween, and thus the shield plates 31 are not in contact with the stator core 4. Thus, it is possible to more reliably prevent the magnetic fluxes from entering the inside of the stator structure 30 from the outside.

Furthermore, in the stator structure 30 according to the second embodiment, the holes 32e, into which the fastening members 19 are inserted, are formed in not the stator core 4 but one of the shield plates 31 (first shield plate 32), and thus it is possible to reduce the outside diameter of the stator core 4.

By employing the resolver according to the second embodiment, it is possible to highly prevent magnetic fluxes from entering the inside of the stator structure 30 from the outside. Consequently, it is possible to prevent reduction in the angle detection accuracy due to the magnetic fluxes from the outside.

In the description mentioned above, although the case is exemplified in which the shield plates 16 (or shield plates 31) are attached to both surfaces (one side surface and the other side surface) of the stator core 4 in the axial direction by using the resin pins 7b and the resin pins 8b integrally formed with the insulator 6, an attachment structure using resin pins (resin pins 8b) on only the other side of the stator core 4 may be employed. Specifically, a constitution may be employed in which only the second shield plate 18 (or second shield plate 33) is attached to the stator core 4. In this case, the first shield plate 17 (or first shield plate 32) may be attached to the housing 22, which is a part to be attached, by using the fastening members 19 such as bolts with the first coil cover 14 interposed therebetween.

In the description mentioned above, although the case is exemplified in which the resolver 1 is an inner rotor type resolver, the present embodiment is able to be applied to an outer rotor type resolver having teeth extending in the radial direction from the annular part, and a stator core arranged inside of a rotor.

According to one aspect of the embodiments, it is possible to prevent reduction in angle detection accuracy caused by a magnetic flux from the outside. For example, it is possible to provide a stator structure and a resolver that are able to prevent reduction in the angle detection accuracy caused by a magnetic flux from the outside.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A stator structure comprising:
   a stator core that includes a plurality of teeth extending from a body part of the stator core in a radial direction thereof, the body part being formed in an annular shape;
   insulators that cover the teeth from both sides in an axial direction of the stator core;
   a coil that is wound around each of the teeth with the insulators interposed therebetween;
   coil covers that cover the coil from both sides in the axial direction, each of the coil covers being formed in an annular shape; and
   shield plates that are attached to the stator core from both sides in the axial direction of the stator core with the respective coil covers interposed therebetween, wherein
      first through holes are formed in the coil covers, the first through holes being along the axial direction of the stator core,
      second through holes are formed in the shield plates, the second through holes being along the axial direction of the stator core, and
      the insulators are provided with pins, the pins being formed along the axial direction of the stator core in an erected manner and having respective distal end parts protruding from the second through holes in a state where the pins are inserted into the first and second through holes, and the protruded distal end parts being fixed to the shield plates.

2. The stator structure according to claim 1, wherein the shield plates includes:
   a first shield plate that is attached to the stator core from one side in the axial direction; and
   a second shield plate that is attached to the stator core from another side in the axial direction, and
   at least one of the first and second shield plates is provided with holes into which fastening members are inserted.

3. The stator structure according to claim 2, wherein the first and second shield plates are provided with respective annular parts each of which is arranged at a position corresponding to the stator core; and
   the at least one of the first and second shield plates includes a flange part extending from the annular part in the radial direction and having the holes.

4. The stator structure according to claim 1, wherein the shield plates includes:
   a first shield plate that is attached to the stator core from one side in the axial direction; and
   a second shield plate that is attached to the stator core from another side in the axial direction,
   the stator core has first, second, and side surfaces, the first surface being on the one side, the second surface being on the other side, and the side surface connecting end edges of the first and second surfaces, and the first shield plate covers the first and side surfaces.

5. The stator structure according to claim 1, wherein the coil covers includes:
   a first coil cover that covers the coil from one side in the axial direction of the stator core; and
   a second coil cover that covers the coil from another side in the axial direction of the stator core,
   the shield plates includes:
      a first shield plate that is attached to the stator core from the one side; and
      a second shield plate that is attached to the stator core from the other side, the first through holes are formed in both of the first and second coil covers, the second through holes are formed in both of the first and second shield plates,
   and the insulators includes:
      first pins that protrude toward the one side in an erected manner and have respective first distal end parts protruding from the second through holes in a state where the first pins are inserted into the first through holes formed in the first coil cover and the second through holes formed in the first shield plate, the protruded first distal end parts being fixed to the first shield plate; and
      second pins that protrude toward the other side in an erected manner and have respective second distal end parts protruding from the second through holes in a state where the second pins are inserted into the first through holes formed in the second coil cover and the second through holes formed in the second shield plate, the protruded second distal end parts being fixed to the second shield plate.

6. A resolver comprising:
   a rotor; and
   a stator structure, wherein the stator structure includes:
      a stator core that includes a plurality of teeth extending from a body part of the stator core in a radial direction thereof, the body part being formed in an annular shape;
      insulators that cover the teeth from both sides in an axial direction of the stator core;
      a coil that is wound around each of the teeth with the insulators interposed therebetween;
      coil covers that cover the coil from both sides in the axial direction, each of the coil covers being formed in an annular shape;
      and shield plates that are attached to the stator core from both sides in the axial direction of the stator core with the respective coil covers interposed therebetween, wherein
         first through holes are formed in the coil covers, the first through holes being along the axial direction of the stator core, second through holes are formed in the shield plates, the second through holes being along the axial direction of the stator core, and the insulators are provided with pins, the pins being formed along the axial direction of the stator core in an erected manner and having respective distal end parts protruding from the second through holes in a state where the pins are inserted into the first and second through holes, and the protruded distal end parts being fixed to the shield plates.

\* \* \* \* \*